United States Patent [19]

Parks

[11] Patent Number: 5,423,575
[45] Date of Patent: Jun. 13, 1995

[54] CONCENTRIC RISER JOINT WITH SELF-ALIGNING COUPLING

[75] Inventor: William C. Parks, Katy, Tex.

[73] Assignee: Sonsub, Inc., Houston, Tex.

[21] Appl. No.: 100,040

[22] Filed: Jul. 30, 1993

[51] Int. Cl.⁶ ............................................. F16L 39/00
[52] U.S. Cl. .................................. 285/133.1; 166/367
[58] Field of Search .................. 285/133.1, 133.2, 302, 285/138–143; 175/215; 166/367

[56] References Cited

U.S. PATENT DOCUMENTS

| | | | |
|---|---|---|---|
| 4,067,596 | 1/1978 | Kellner et al. | 285/133.2 |
| 4,176,863 | 12/1979 | Wetmore | 285/133.1 X |
| 4,274,663 | 6/1981 | Beiker et al. | 285/133.2 X |
| 5,060,987 | 10/1991 | Miller | 285/354 |

OTHER PUBLICATIONS

Drawing of Concentric Riser Coupling taken from a promotional brochure of Hughes Offshore, undated but at least as early as 1987.

*Primary Examiner*—William P. Neuder
*Attorney, Agent, or Firm*—Pravel, Hewitt, Kimball & Krieger

[57] ABSTRACT

A concentric riser joint comprising inner and outer tubular assemblies each having a longitudinal bore therethrough. An annular space is formed between the inner and outer tubular assemblies. The outer tubular assembly comprises a tubular element having a pin end coupling connected to a first end and a box end coupling connected to a second end of the tubular element. A cylindrical retainer plate is received in the pin end coupling. The cylindrical retainer plate has an inner bore for receiving the inner tubular assembly therethrough. The retainer plate further includes a plurality of longitudinal bores extending therethrough. A seal sub is connected to one end of the inner tubular assembly. The seal sub is partially received in the box end coupling and includes a plurality of longitudinal passageways extending therethrough. A threaded nut connects the outer tubular assembly to an adjoining concentric riser joint. The box end coupling and the pin end coupling each have a mating end surface with a longitudinal blind bore therein such that the plurality of longitudinal passageways and the plurality of longitudinal bores are in axial alignment when the longitudinal blind bores are axially aligned. An alignment pin is fixedly received in one of the longitudinal blind bores. The alignment pin axially aligns the plurality of longitudinal passageways of the riser joint with the plurality of longitudinal bores of an adjoining riser joint.

25 Claims, 2 Drawing Sheets

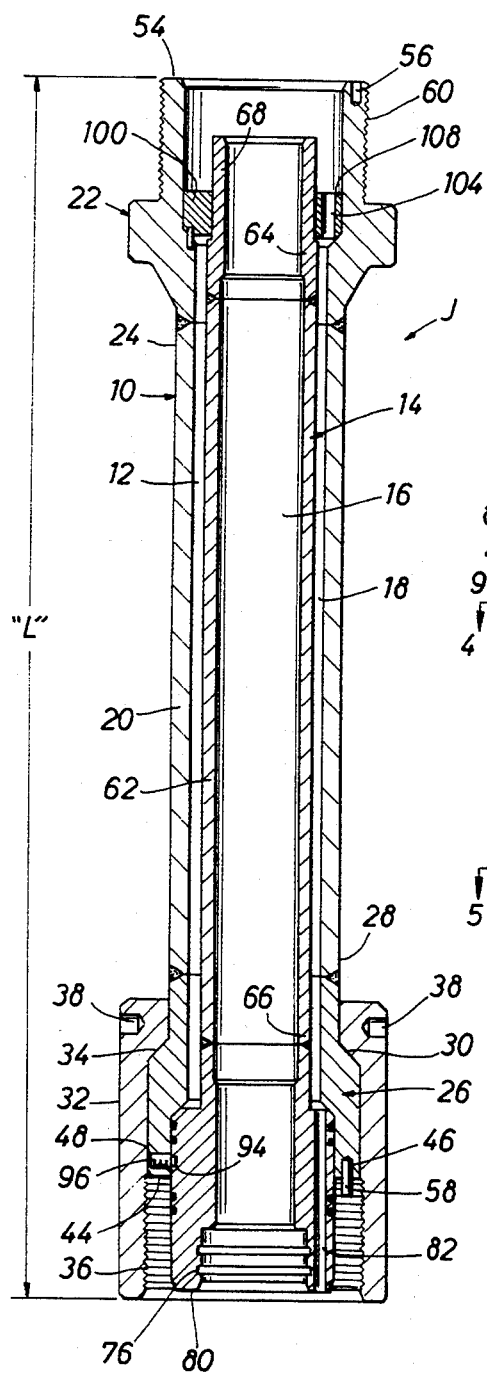
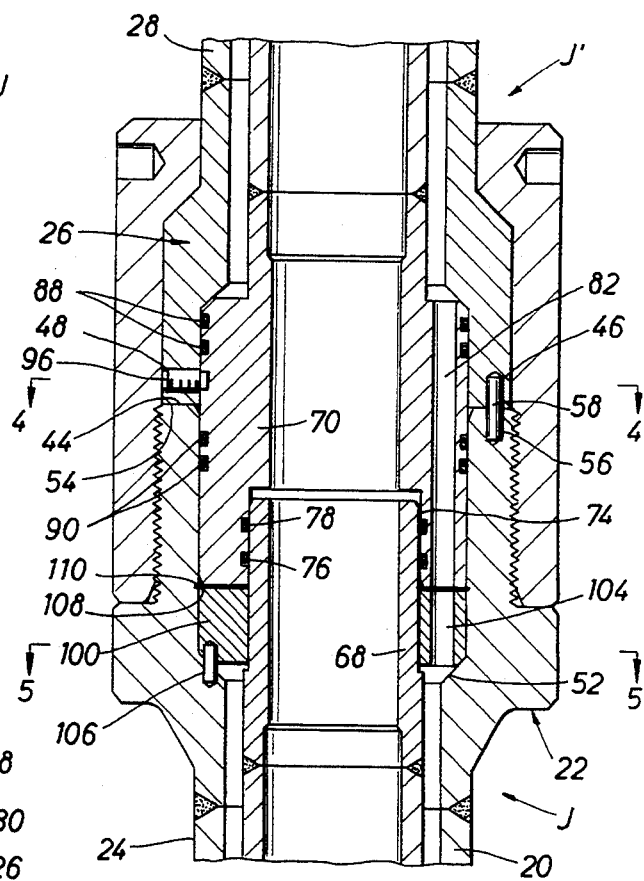
FIG.1
FIG.2

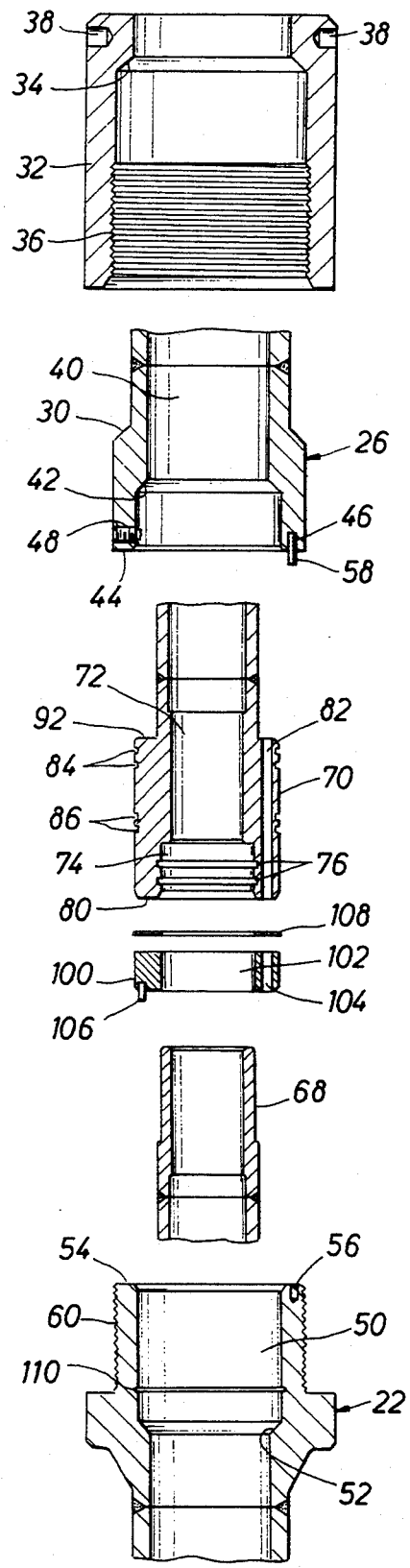
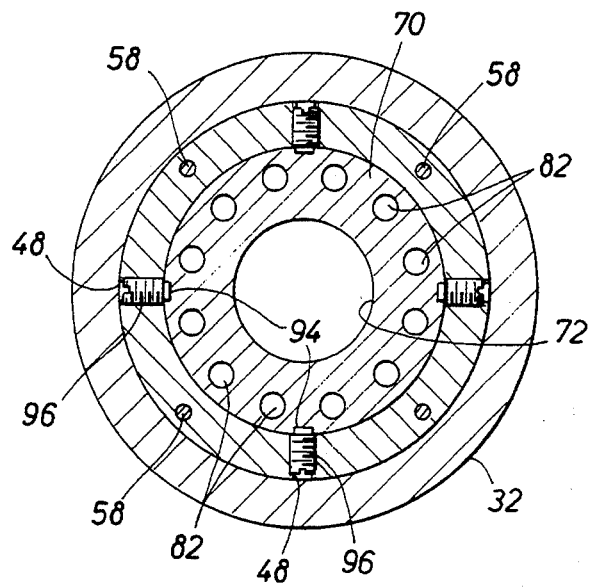
FIG. 4
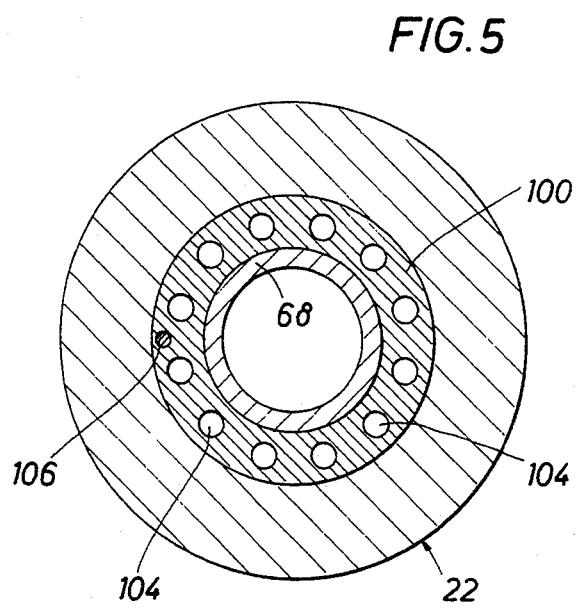
FIG. 5
FIG. 3

CONCENTRIC RISER JOINT WITH SELF-ALIGNING COUPLING

BACKGROUND OF THE INVENTION

1. Field of the Invention

The present invention relates to concentric riser joints and more particularly, to concentric riser joints with a self-aligning coupling.

2. Description of the Prior Art

A marine riser system is used to guide a drill string to the wellhead and provide a fluid flow path between the top of the wellbore, which is on the ocean floor, and the drilling equipment, located above the surface of the water. The marine riser system comprises several sections or joints of pipe and special devices to compensate for any movement of the drilling rig caused by waves.

One of the joints of pipe in the marine riser system is termed a standard riser joint. Typically, the standard riser joint is provided in 50 foot lengths. Several standard riser joints are coupled together in the marine riser system with the exact number depending on the water depth.

A concentric riser comprises an inner pipe housed inside an outer pipe with an annular area therebetween. The inner pipe serves as the primary flow conduit and also provides vertical access to the well production bore for drilling, wireline or coiled tubing intervention. The annular area between the two pipes provides a second flow path which can be used to circulate the well or otherwise communicate with an annulus bore in the subsea Christmas tree or tubing hanger.

Prior art concentric riser joints have included end couplings with passageways for the annular fluid to pass therethrough. From an operational and fluid flow standpoint, the optimum design for a concentric riser joint would have no obstructions in the primary flow path and the annular flow path. However, some obstruction in the annular flow path will always occur at the couplings of the riser joint. Additionally, the annular fluid flow disturbances should be minimized at the coupled connection between two joined riser joints.

It is desirable to have a concentric riser joint which minimizes the fluid flow disturbances in the annular flow path. It is further desirable that the concentric riser joint self-aligns with an adjoining concentric riser joint to ensure that fluid flow disturbances are kept to a minimum.

SUMMARY OF THE PRESENT INVENTION

The present invention is a concentric riser joint having a self-aligning coupling. The self-aligning coupling of the present invention ensures that annular fluid flow disturbances are minimized through the coupling.

The concentric riser joint comprises inner and outer tubular assemblies each having a longitudinal bore therethrough. An annular space is formed between the inner and outer tubular assemblies.

The outer tubular assembly includes a tubular element having a pin end coupling connected to a first end and a box end coupling connected to a second end of the tubular element. A cylindrical retainer plate is received in the pin end coupling. The cylindrical retainer plate has an inner bore for receiving the inner tubular assembly therethrough. The retainer plate further includes a plurality of longitudinal bores extending therethrough. A seal sub is connected to one end of the inner tubular assembly. The seal sub is partially received in the box end coupling and includes a plurality of longitudinal passageways extending therethrough. A threaded nut connects the outer tubular assembly to an adjoining concentric riser joint. The box end coupling and the pin end coupling each have a mating end surface with a plurality of longitudinal blind bores therein such that the plurality of longitudinal passageways and the plurality of longitudinal bores are in axial alignment when the plurality of longitudinal blind bores are axially aligned. An alignment pin is fixedly received in each of the longitudinal blind bores in the box end coupling. The alignment pins axially align the plurality of longitudinal passageways of the riser joint with the plurality of longitudinal bores of an adjoining riser joint.

BRIEF DESCRIPTION OF THE DRAWINGS

In order to more fully understand the drawings referred to in the detailed description of the present invention, a brief description of each drawing is presented, in which:

FIG. 1 is an longitudinal sectional view of the concentric riser joint with self-aligning coupling according to the present invention, and with the section on the left hand side being cut at a 135° angle with respect to the right hand side;

FIG. 2 is an longitudinal sectional view of the self-aligning coupling joining an upper concentric riser joint to a lower concentric riser joint, and with the section on the left hand side being cut at a 135° angle with respect to the right hand side;

FIG. 3 is an exploded view of the self-aligning coupling, and with the section on the left hand side being cut at a 135° angle with respect to the right hand side;

FIG. 4 is a view taken along line 4—4 of FIG. 2; and

FIG. 5 is a view taken along line 5—5 of FIG. 2.

DETAILED DESCRIPTION OF THE INVENTION

Referring now to the drawings in greater detail, the concentric riser joint with self-aligning coupling of the present invention, generally designated by the letter J, comprises an outer tubular assembly 10 having a longitudinal bore 12 therethrough and an inner tubular assembly 14 having a longitudinal bore 16 therethrough. As will be explained in greater detail below, the inner tubular assembly 14 is mounted within the outer tubular assembly 10. As shown in FIG. 1, an annular space 18 is formed between the inner and outer tubular assemblies 14 and 10, respectively.

Referring to FIG. 1, the outer tubular assembly 10 comprises a tubular element 20 having a pin end coupling 22 connected to a first end 24 and a box end coupling 26 connected to a second end 28 of the tubular element 20. As shown in FIG. 3, the box end coupling 26 has a longitudinal bore 40 therethrough with an internal circumferential tapered shoulder 42.

A nut 32 is installed on the box end coupling 26. The nut 32 has an internal circumferential shoulder 34 cooperatively engaging an external circumferential shoulder 30 of the box end coupling 26. The nut 32 is allowed to rotate relative to the box end coupling 26 while being limited in axial movement by the abutting circumferential shoulders 30 and 34. Referring to FIGS. 1, 2 and 3, the nut 32 includes an internally threaded end portion 36. In the preferred embodiment of the present invention, the nut 32 also includes means to facilitate the rotation of the nut. As shown in FIGS. 1, 2 and 3, one or more radial blind bores 38 are formed in the nut 32 for receiving a spanner bar (not shown) to rotate the nut 32. It is to be understood that other means to facilitate the rotation of the nut which are common in the industry may also be used.

Referring to FIG. 3, the pin end coupling 22 has a longitudinal bore 50 therethrough with an internal circumferential tapered shoulder 52. The pin end coupling 22 includes an externally threaded end portion 60 corresponding to the internally threaded end portion 36 of the nut 32.

Referring to FIGS. 1 and 3, the box end coupling 26 includes a lower end face 44 with a plurality of longitudinal blind bores 46 therein. The pin end coupling 22 includes an upper end face 54 with a plurality of longitudinal blind bores 56 therein. As shown in FIG. 1, the longitudinal blind bores 46 of the box end coupling 26 are axially aligned with the longitudinal blind bores 56 of the pin end coupling 22. Alignment pins 58 are fixedly received in the blind bores 46 and adapted to be slidably received in the blind bores 56 of the pin end coupling 22.

Referring to FIG. 1, the inner tubular assembly 14 comprises a tubular element 62 having a first end 64 and a second end 66. The first end 64 has a stab portion 68 weldably connected thereto.

A seal sub 70 is weldably connected to the second end 66 of the inner tubular assembly 14. Referring to FIG. 3, the seal sub 70 has a central longitudinal bore 72 therethrough with a receiving end portion 74. As shown in FIG. 4, a plurality of circumferentially spaced longitudinal passageways 82 surround the central longitudinal bore 72. Referring again to FIG. 3, the receiving end portion 74 includes a pair of internal circumferential grooves 76 for receiving seal means 78, as for example O-rings, as shown in FIG. 2. The seal sub 70 has an end face 80 and an upper face 92. An upper pair of external circumferential grooves 84 and a lower pair of external circumferential grooves 86 for receiving box seal means 88 and pin seal means 90, respectively, are provided in the outer surface of the seal sub 70. The seal means 88 and 90 are shown in FIG. 2 as O-rings although other typical seal means may also be used.

As shown in FIG. 1, the seal sub 70 is partially received in the longitudinal bore 40 of the box end coupling 26. The upper face 92 of the seal sub 70 is positioned at the internal circumferential tapered shoulder 42 of the box end coupling 26. The lower end face 80 of the seal sub 70 extends beyond the lower end face 44 of the box end coupling 26. The pair of box seal means 88 provides a fluid tight seal between the box end coupling 26 and the seal sub 70.

Referring to FIGS. 1 and 4, the seal sub 70 has a plurality of radial blind holes 94 in axial alignment with a plurality of radial holes 48 extending through the box end coupling 26. The seal sub 70 is affixed to the box end coupling 26 by retaining pins 96 inserted into the radial holes 48 and extending into the aligned radial blind holes 94. The retaining pins 96 prevent both axial and rotational movement of the inner tubular assembly 14 relative to the outer tubular assembly 10.

Referring to FIG. 1, a cylindrical retainer plate 100 is received in the longitudinal bore 50 of the pin end coupling 22. The cylindrical retainer plate 100 has an inner bore 102 for receiving the stab portion 68 of the inner tubular assembly 14 therethrough. Referring to FIG. 5, the retainer plate 100 further includes a plurality of circumferentially spaced longitudinal bores 104 extending therethrough and surrounding the inner bore 102.

The retainer plate 100 is restricted from rotational movement relative to the pin end coupling 22 by a pin 106 interconnecting the retainer plate 100 and the pin end coupling 22. The retainer plate 100 is installed in the pin end coupling 22 so that the plurality of longitudinal bores 104 are in axial alignment with the plurality of longitudinal passageways 82 of the seal sub 70 installed in the box end coupling 26.

The axial movement of the retainer plate 100 relative to the pin end coupling 22 is restricted at the lower end of the retainer plate 100 by abutting contact with the internal circumferential tapered shoulder 52 of the pin end coupling 22. The axial movement of the retainer plate 100 relative to the pin end coupling 22 is restricted at its upper end by abutting contact with a retainer ring 108 inserted in a retainer ring groove 110 as shown in FIG. 3.

As shown in FIG. 3, the stab portion 68 extends through the inner bore 102 of the retainer plate 100 and is adapted to be slidably received in the receiving end portion 74 of a seal sub 70 of an adjoining riser joint J'.

OPERATION OF THE PRESENT INVENTION

In the operation and use of the concentric riser joint with self-aligning coupling J, the lower end or box end coupling 26 of the joint J is vertically lowered onto an upwardly facing pin end coupling 22. The lower end face 80 of the seal sub 70 is received in the longitudinal bore 50 of the pin end coupling 22. As the seal sub 70 enters the longitudinal bore 50 of the pin end coupling 22, the lower end of the nut 32 remains generally at the upper end face 54 of the pin end coupling 22. Referring to FIG. 2, the receiving end portion 74 of the seal sub 70 of the adjoining riser joint J' is then slidably lowered onto the extending stab portion 68 of the inner tubular assembly 14. The pair of seal means 78 provides a fluid tight seal between the seal sub 70 and the stab portion 68 to maintain fluid within and prevent other fluid from entering the longitudinal bore 16 of the inner tubular assembly 14.

The adjoining riser joint J' is rotated until the alignment pins 58 of the box end coupling 26 align with the blind bores 56 of the pin end coupling 22. Once aligned, the alignment pins 58 slide into the blind bore 56 and the upper end face 54 of the pin end coupling 22 and the lower end face 44 of the box end coupling 26 are allowed to come into contact with one another as shown in FIG. 2. The alignment pins 58 axially align the plurality of longitudinal passageways 82 of the adjoining riser joint J' with the plurality of longitudinal bores 104 of the riser joint J.

It is to be understood that when the alignment pins 58 are inserted into the blind bores 56 of the pin end coupling 22 that the plurality of longitudinal passageways 82 of the seal sub 70 are all axially aligned with the plurality of longitudinal bores 104 of the retainer plate 100 as shown in FIG. 4.

The threaded nut 32 is rotated by inserting a spanner bar in the radial blind bores 38. Once the nut 32 has been tightened onto the externally threaded end portion 60 of the pin end coupling 22, the coupling of the adjoining concentric riser joint J' to the concentric riser joint J is completed. It is noted that preferably there is a small gap between the end face of the seal sub 70 and the retainer plate 100 to allow for expansion of the elements without stressing the threaded connection provided by the nut 32. The gap is preferably small and does not appreciably affect fluid flow.

It is important to understand that the completed coupling of the two concentric riser joints J and J' minimizes fluid flow disturbances in the annular flow path through the coupling. Annular fluid flow disturbances result from non-aligned flow passageways through the riser joint coupling. In the present invention, fluid flow disturbances are minimized since the self-aligning coupling ensures that the annular flow passageways are axially aligned through the coupling.

For exemplary purposes, the inner tubular element 62 may be a 5" nominal (5.562" O.D.×0.656" wall thickness) pipe housed inside an 8" nominal (8.625" O.D.×1,000" wall thickness) outer tubular element 20. A standard riser joint of 50' in length is typical, although in deepwater applications (beyond 3000') 75" riser joints are desirable. Riser joints of shorter lengths, called pup joints, are used if needed. The pin end coupling 22 has a 13⅜" outside diameter and has a 10½"-3 pitch Stub Acme thread. The internal seal sub 70 and the retainer plate 100 preferably have twelve passageways 82 and bores 104, respectively, having a ¾" diameter. This configuration provides an equivalent flow area equal to twice that of a 2" bore to allow circulation through the coupling. This riser joint J is capable of working in water depths of 6,000 feet and is rated for 10,000 pounds per square inch working pressure.

The foregoing disclosure and description of the invention is illustrative and explanatory thereof, and various changes in the size, shape, and materials, as well as in the details of illustrative construction and assembly, may be made without departing from the spirit of the invention.

I claim:

1. A concentric riser joint comprising:
   an inner tubular assembly having a longitudinal bore therethrough;
   an outer tubular assembly having a longitudinal bore therethrough;
   first means for mounting said inner tubular assembly within said outer tubular assembly, said first means for mounting including a plurality of longitudinal passageways extending therethrough;
   second means for mounting said inner tubular assembly within said outer tubular assembly, said second means for mounting including a plurality of longitudinal bores extending therethrough,
   wherein an annular space is formed between said inner and outer tubular assemblies;
   a connecting member rotatably mounted to said outer tubular assembly; and
   means for axially aligning said plurality of longitudinal passageways of the riser joint with said plurality of longitudinal bores of an adjoining riser joint.

2. The riser joint of claim 1, wherein said outer tubular assembly comprises:
   a tubular element having a first end and a second end;
   a pin end coupling connected to said first end of said tubular element; and
   a box end coupling connected to said second end of said tubular element.

3. The riser joint of claim 2, wherein said box end coupling includes an external circumferential shoulder and said pin end coupling includes an externally threaded end portion,
   wherein said connecting member comprises a nut having an internally threaded end portion and an internal circumferential shoulder, said internal circumferential shoulder cooperatively engaging said external circumferential shoulder of said box end coupling, and said internally threaded end portion of said nut corresponding to said externally threaded end portion of said pin end coupling.

4. The riser joint of claim 2, wherein said pin end coupling has a longitudinal bore therethrough and said first means for mounting comprises a cylindrical retainer plate having an inner bore receiving said inner tubular assembly therethrough, said cylindrical retainer plate is received in said longitudinal bore of said pin end coupling.

5. The riser joint of claim 4, wherein said box end coupling has a longitudinal bore therethrough and said inner tubular assembly has a first end and a second end, and said second means for mounting comprises a seal sub connected to said second end of said inner tubular assembly, said seal sub is partially received in said longitudinal bore of said box end coupling.

6. The riser joint of claim 5, further comprising means for affixing said inner and outer tubular assemblies to one another.

7. The riser joint of claim 6, wherein said box end coupling has a radial hole therethrough and said seal sub has a radial blind bore in axial alignment with said radial hole and said means for affixing comprises a retaining pin inserted in said aligned radial hole and bore.

8. The riser joint of claim 5, wherein said box end coupling and said pin end coupling each have a mating end surface with a longitudinal blind bore therein, said means for axially aligning includes an alignment pin fixedly received in one of said longitudinal blind bores, wherein said plurality of longitudinal passageways and said plurality of longitudinal bores are in axial alignment when said longitudinal blind bores are axially aligned.

9. The riser joint of claim 8, wherein said alignment pin has a first portion and a second portion, said first portion being fixedly received in one of said longitudinal blind bores and said second portion adapted to be slidably received in the other of said longitudinal blind bores.

10. The riser joint of claim 5, wherein said seal sub has a receiving end portion and said first end of said inner tubular assembly has a stab portion adapted to be slidably received in said receiving end portion of said seal sub of an adjoining riser joint.

11. The riser joint of claim 5, wherein said seal sub has a sub end face and said retainer plate has a plate face, wherein said plate face is adapted to provide a small gap between said plate face and said sub end face of said seal sub of an adjoining riser joint.

12. A concentric riser joint comprising:
   an inner tubular assembly having a longitudinal bore therethrough;
   an outer tubular assembly having a longitudinal bore therethrough, said outer tubular assembly comprising a tubular element having a pin end coupling connected to a first end and a box end coupling connected to a second end of said tubular element;
   first means for mounting said inner tubular assembly within said outer tubular assembly, said first means for mounting including a plurality of longitudinal passageways extending therethrough;
   second means for mounting said inner tubular assembly within said outer tubular assembly, said second means for mounting including a plurality of longitudinal bores extending therethrough, wherein an annular space is formed between said inner and outer tubular assemblies;

means for connecting said outer tubular assembly to an adjoining concentric riser joint; and means for ensuring axial alignment of said plurality of longitudinal passageways of the riser joint with said plurality of longitudinal bores of an adjoining riser joint.

13. The riser joint of claim 12, wherein said box end coupling and said pin end coupling each have a mating end surface with a longitudinal blind bore therein, said means for ensuring axial alignment includes an alignment pin fixedly received in one of said longitudinal blind bores, wherein said plurality of longitudinal passageways and said plurality of longitudinal bores are in axial alignment when said longitudinal blind bores are axially aligned.

14. The riser joint of claim 13, wherein said alignment pin has a first portion and a second portion, said first portion being fixedly received in one of said longitudinal blind bores and said second portion adapted to be slidably received in the other of said longitudinal blind bores.

15. The riser joint of claim 12, wherein said first means for mounting comprises a cylindrical retainer plate having an inner bore receiving said inner tubular assembly therethrough, said cylindrical retainer plate is received in said pin end coupling.

16. The riser joint of claim 15, wherein said inner tubular assembly has a first end and a second end and said second means for mounting comprises a seal sub connected to said second end of said inner tubular assembly, said seal sub is partially received in said box end coupling.

17. The riser joint of claim 16, wherein said seal sub has a receiving end portion and said first end of said inner tubular assembly has a stab portion adapted to be slidably received in said receiving end portion of said seal sub of an adjoining riser joint.

18. The riser joint of claim 16, wherein said seal sub has a sub end face and said retainer plate has a plate face, wherein said plate face is adapted to provide a small gap between said plate face and said sub end face of said seal sub of an adjoining riser joint.

19. A concentric riser joint coupling comprising:

a pin end coupling having a longitudinal bore therethrough;

a box end coupling having a longitudinal bore therethrough;

means for connecting said pin end coupling to said box end coupling;

a seal sub partially received in said longitudinal bore of said box end coupling, said seal sub having a central longitudinal bore therethrough and a plurality of circumferentially spaced longitudinal passageways therethrough;

a cylindrical retainer plate received in said longitudinal bore of said box end coupling, said retainer plate having a central longitudinal bore therethrough and a plurality of circumferentially spaced longitudinal bores therethrough; and means for ensuring axial alignment of said plurality of longitudinal passageways with said plurality of longitudinal bores.

20. The riser joint coupling of claim 19, wherein said box end coupling includes an external circumferential shoulder and said pin end coupling includes an externally threaded end portion, wherein said means for connecting comprises a nut having an internally threaded end portion and an internal circumferential shoulder, said internal circumferential shoulder cooperatively engaging said external circumferential shoulder of said box end coupling, and said internally threaded end portion of said nut corresponding to said externally threaded end portion of said pin end coupling.

21. The riser joint coupling of claim 19, further comprising means for affixing said box end coupling to said seal sub.

22. The riser joint coupling of claim 21, wherein said box end coupling has a radial hole therethrough and said seal sub has a radial blind bore in axial alignment with said radial hole and said means for affixing comprises a retaining pin inserted in said aligned radial hole and bore.

23. The riser joint coupling of claim 19, wherein said box end coupling and said pin end coupling each have a mating end surface with a longitudinal blind bore therein, said means for ensuring axial alignment includes an alignment pin fixedly received in one of said longitudinal blind bores, wherein said plurality of longitudinal passageways and said plurality of longitudinal bores are in axial alignment when said longitudinal blind bores are axially aligned.

24. The riser joint coupling of claim 23, wherein said alignment pin has a first portion and a second portion, said first portion being fixedly received in one of said longitudinal blind bores and said second portion adapted to be slidably received in the other of said longitudinal blind bores.

25. The riser joint coupling of claim 19, wherein said seal sub has a sub end face and said retainer plate has a plate face, wherein said plate face is adapted to provide a small gap between said plate face and said sub end face of said seal sub in the coupled condition.

* * * * *

UNITED STATES PATENT AND TRADEMARK OFFICE
CERTIFICATE OF CORRECTION

PATENT NO. : 5,423,575
DATED : June 13, 1995
INVENTOR(S) : William C. Parks

It is certified that error appears in the above-identified patent and that said Letters Patent is hereby corrected as shown below:

Column 5, line 15, change "1,000″" to --1.000″--.

Column 5, line 17, change "75″" to --75′--.

Signed and Sealed this

Twenty-ninth Day of August, 1995

Attest:

BRUCE LEHMAN

Attesting Officer  Commissioner of Patents and Trademarks